United States Patent [19]
Cadwallader

[11] 3,972,360
[45] Aug. 3, 1976

[54] VIBRATION RESISTANT FASTENER
[75] Inventor: James W. Cadwallader, Lansdale, Pa.
[73] Assignee: Standard Pressed Steel Co., Jenkintown, Pa.
[22] Filed: May 17, 1974
[21] Appl. No.: 470,874

[52] U.S. Cl. ................................. 151/22; 151/37
[51] Int. Cl.² ........................................ F16B 39/30
[58] Field of Search ............ 151/22, 37; 85/41, 43, 85/46, 47

[56] References Cited
UNITED STATES PATENTS

| | | | |
|---|---|---|---|
| 1,933,332 | 10/1933 | May | 85/47 |
| 2,959,204 | 11/1960 | Rigot | 151/37 |
| 3,078,899 | 2/1963 | MacLean et al. | 151/37 |
| 3,176,746 | 4/1965 | Walton | 151/22 |
| 3,339,389 | 9/1967 | Mosow | 151/22 |
| 3,825,051 | 7/1974 | Sigmund | 151/37 |

FOREIGN PATENTS OR APPLICATIONS

| | | | |
|---|---|---|---|
| 71,848 | 11/1893 | Germany | 85/46 |

*Primary Examiner*—Roy D. Frazier
*Assistant Examiner*—Thomas J. Holko
*Attorney, Agent, or Firm*—Andrew L. Ney; Aaron Nerenberg

[57] ABSTRACT

A vibration resistant threaded fastener which may be a set screw or any other type of threaded fastener wherein the load bearing flank of the threaded surface of the screw is provided with a series of serrations. Each serration is formed with an inclined ramp terminating in a buttress with the ramp surface being inclined in the direction of tightening the fastener so that the buttress presents a surface tending to act against rotation of the fastener to preclude loosening of the fastener. Upon engagement in a workpiece under compressive load the buttress of the serrations coact with the thread flank of the mating internal thread in a workpiece to preclude disengagement of the fastener. In one embodiment of the fastener bearing pads are provided to limit the degree of coaction between the serrations and the thread flank of the workpiece.

17 Claims, 10 Drawing Figures

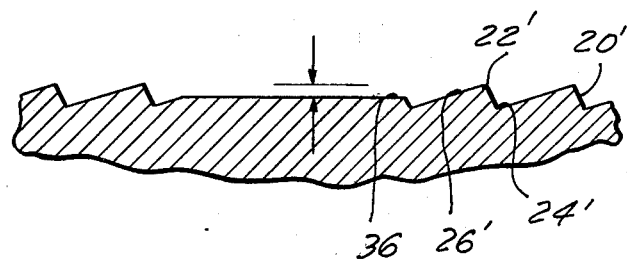
FIG. 7
FIG. 5
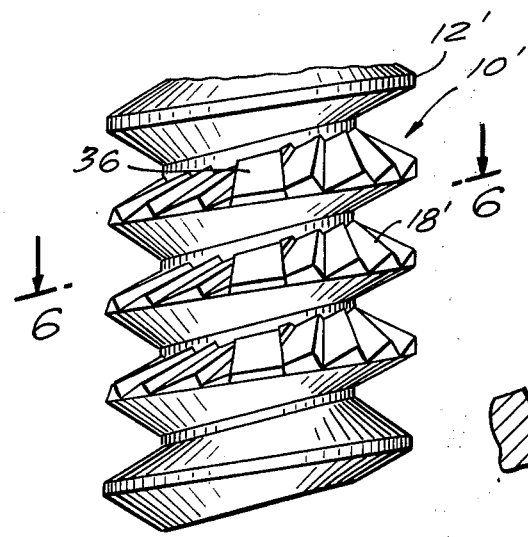
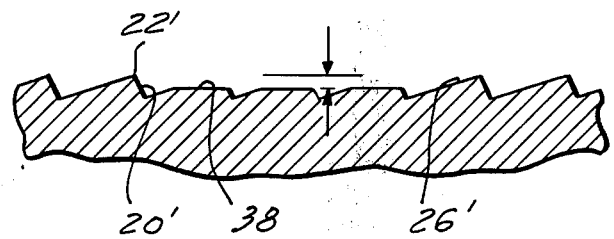
FIG. 8
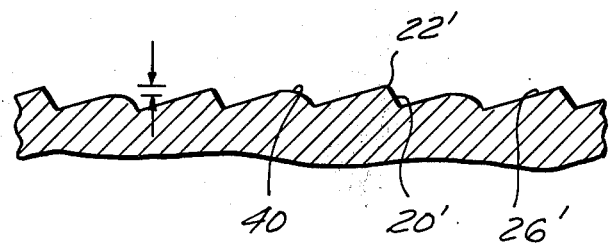
FIG. 9
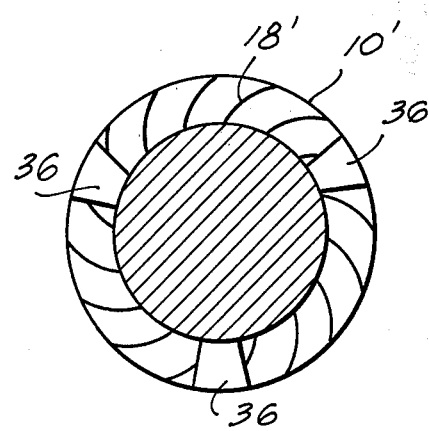
FIG. 6

VIBRATION RESISTANT FASTENER

The present invention relates to vibration resistant threaded fasteners.

In many applications requiring a threaded fastener such as a set screw, the set screw is threadably engaged within one workpiece to have an end bear against and frictionally grip a second workpiece to secure the two workpieces together. In such an application it is imperative, especially where the workpieces are subjected to vibration, to insure that the set screw does not loosen so that the workpieces can move relative to each other. Accordingly, set screws have been designed with anti-rotation features in an attempt to minimize loosening or back-off of the set screw when the workpieces in which it is installed are subjected to vibration. One suggested solution is to provide the seating end or point of the set screw with an irregular configuration, for example a knurled cup configuration, so that the knurled end of the set screw achieves a degree of purchase when it bears against the surface of the workpiece. However, the surface area of the set screw end is necessarily limited so that the frictional engaging surface is also limited and such set screws have not provided an entirely satisfactory rotation resistant feature.

In other applications requiring a threaded fastener such as a bolt or screw, the bolt or screw is threadably engaged to form a joint and is either threadably engaged within at least one workpiece or in a nut. In such applications where the completed joint is subjected to vibration it is also desirable to insure the joint integrity by precluding back-off of the bolt or screw.

Accordingly, it is an object of the present invention to provide a rotation resistant threaded fastener which has noticeably improved rotation resistant properties when installed in a workpiece.

It is a still further object of the present invention to provide a rotation resistant threaded fastener with improved rotation resistant properties and which may be readily and economically manufactured.

It is a still further object of the present invention to provide a threaded fastener which exhibits markedly improved rotation resistant properties and which may be repeatedly engaged and disengaged from the workpieces in which it is employed without marked deterioration in the rotation resistant property of the fastener.

In accordance with a preferred embodiment of the present invention an irregular surface configuration is imparted to the flank of the threads of a threaded fastener member which bears the load when the fastener is in compressive loading. The irregular surface configuration on the thread flank is in the form of an inclined ramp and buttress with the buttress disposed at an angle with respect to a plane passing through the longitudinal axis of the fastener. The incline of the ramp is oriented in the direction of rotation to engage the threaded fastener to preclude frictional resistance while the fastener is engaged. Once the fastener is fully seated and engaged the buttress of each of the serrations coacts with the mating internal thread in a workpiece to resist the tendency of the threaded fastener to rotate in the opposite direction and back off.

In an another embodiment of the present invention bearing pads are provided to limit the degree of coaction between the serrations and the thread flank of the workpiece.

These and other objects and advantages of the present invention will be more readily apparent after consideration of the following specification in conjunction with the drawing.

In the Drawing:

FIG. 5 is an enlarged perspective showing another embodiment of the irregular surface configuration placed on the load bearing flank of the threads of a threaded fastener member according to the present invention;

FIG. 6 is a sectional view taken along the helix angle of the thread generally along the line 6—6 of FIG. 5 showing the orientation of the irregular surface configuration on the load bearing flank of a thread; and FIGS. 7–9 are partial elevational views showing three alternate embodiments of the irregular surface configuration.

Figure 1:
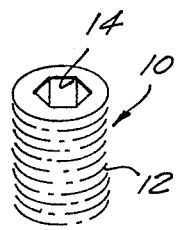
FIG. 1 is a schematic perspective view showing one embodiment of a threaded fastener according to the present invention.

With reference to the drawing and particularly FIGS. 1 through 4A, a threaded fastener 10 constructed in accordance with the present invention is shown. For illustrative purposes threaded fastener 10 is shown as a socket set screw but it is to be expressly understood that any type of threaded fastener member such as a bolt or screw may also be utilized in accordance with the present invention.

Threaded fastener 10 includes a standard thread configuration 12 and one end of fastener 10 includes a suitable indentation 14 to receive a wrenching member to permit the set screw 10 to be rotated into engagement in a cooperating threaded bore in a workpiece.

Figure 2:
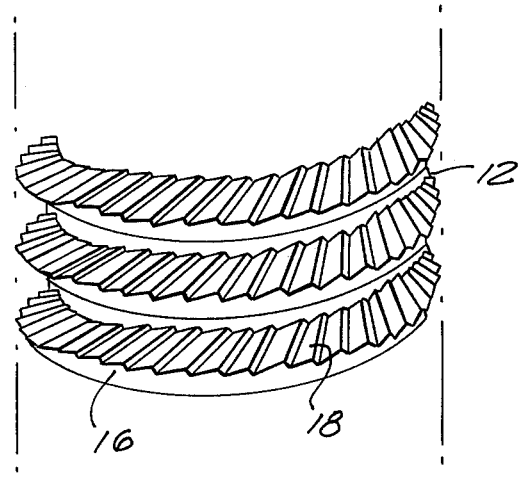
FIG. 2 is an enlarged perspective showing one embodiment of the irregular surface configuration placed on the load bearing flank of the threads of a threaded fastener member according to the present invention.
Figure 3:
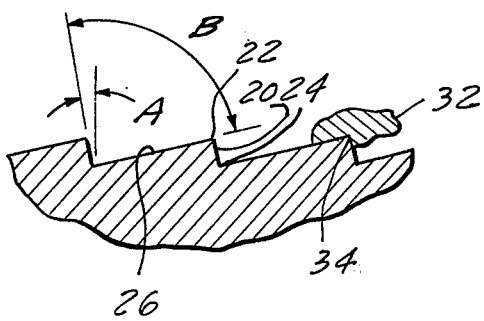
FIG. 3 is a partial elevational view with a partial showing of a mating thread configuration.

As best seen in FIG. 2, the load bearing flank 16 of each individual thread 12, or if desired on the load bearing flanks of at least two adjacent threads, is provided with an irregular serrated configuration 18 around the circumference of the thread to impart a rotation resistant property to the fastener 10 when it is engaged in a threaded receiving bore of a workpiece and a compressive load is impressed on the fastener.

When the serrations 18 are viewed along a cylinder concentric with the longitudinal axis of the fastener, the serrations are seen to be in the form of teeth. These teeth are generally saw-tooth in shape and each include a wall or buttress 20 extending between the crest 22 of a given tooth and the root 24 of an adjacent tooth. An inclined surface or ramp 26 extends between the crest 22 and the root 24 of an adjacent tooth.

The ramp 26 of each serration is inclined with respect to a plane parallel to the helix angle of the thread formation of the screw 10 at an angle of between 5° and 25°. In addition, the buttress 20 is inclined with respect to a plane parallel to the longitudinal axis of the fastener shown at A in FIG. 3. Angle A is in the range of between 5° and 20° and preferably is about 10°. The inclination of each buttress 20 provides a beneficial effect which will be described more fully hereinafter. In addition, it has been found that the included angle, shown at B, between a buttress 20 and a ramp 26 of the next adjacent tooth should be in the range of between 70° and 90°.

It has also been found to be preferable to have each of the buttresses skewed with respect to the radial center of the fastener 10 with the skew angle being in the range of 15° to 35° with respect to a radius taken from the radial center of the fastener 10 to the individual serration 18.

Figure 4A:
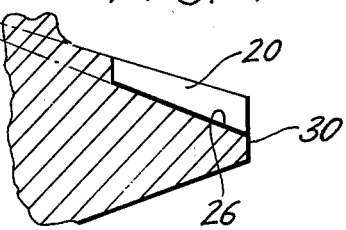
FIG. 4A is an elevational view as in FIG. 4 showing a feature of the invention.
Figure 4:
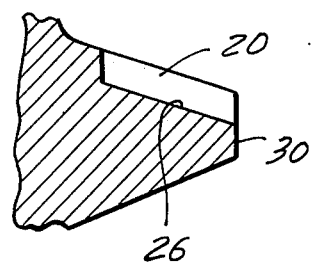
FIG. 4 is an elevational view taken along a plane parallel to a serration on the thread flank of a threaded fastener.

As best seen in FIG. 4, the height of buttresses 20 is constant along the flank 16 but it should be understood that it could vary, as shown in FIG. 4A. Also, as best seen in FIGS. 4 and 4A, serrations 18 extend from the crest 30 of thread 12 inwardly of the pitch diameter 28 and terminate adjacent the root of the thread. If fatigue strength of the fastener is not important to its function, serrations 18 could extend to the root, but where fatigue strength is important, the serrations should terminate adjacent the root of the thread so as not to allow the root to be marred thereby detracting from its fatigue strength.

The ramp 26 of each serration 18 is inclined in the direction of rotation of the fastener 10 when it is rotated towards its engaging position, i.e. clockwise for a right-hand thread. Thus, during rotation of the fastener 10 into engagement within a cooperatively threaded receiving bore in a workpiece, and before any compressive load is applied to the fastener 10, the walls or buttresses 20 of each serration provide no frictional impedence to the rotational engagement of the fastener 10. Once the fastener is seated so that a compressive load is induced on the fastener, further inward movement of the fastener 10 becomes restricted. Continual application of a seating torque until a predetermined load is reached impresses a compressive load on the fastener 10.

As the compressive load increases on fastener 10, the load bearing flank 16 of each of the threads of the fastener 10 is forced into more intimate contact with a mating thread flank in the internally threaded receiving bore in the workpiece in which the fastener 10 is engaged. This compressive force between the load bearing flanks of the mating thread forms results in a substantially elastic deformation of the load bearing flank of the internal thread configuration in the workpiece so that, in essence, the ramp 26 of each serration is depressed into the mating load bearing flank of the internally threaded workpiece, shown at 32 in FIG. 3, so that there is a slight lapping over of the material from the workpiece, as at 34, against the buttress 20. This slight deformation in the internal thread configuration of the workpiece as it abuts against the buttress 20 of each of the serrations 18 precludes rotation of the fastener in the opposite direction which would tend to loosen the fastener or back it off from engagement within the workpiece.

While the depression is appreciable at each serration so that an approproiate "off" torque may be applied to loosen the fastener, the locking action provided by the multiplicity of serrations affords sufficient anti-rotation resistance to effectively preclude the set screw from backing off when the workpieces are subjected to vibration. Because the individual deformation adjacent each buttress 20 is essentially elastic in nature, no appriciable damage or distortion results to the thread configuration on either the fastener 10 or the mating internal thread configuration of the workpiece in which it is engaged.

Preferably the buttress 20 and crest 22 of each serration are oriented either in the same plane at the desired skewed angle to a radial of the fastener 10 or are generally skewed to a radial of this fastener 10 but are formed in the shape of an arcuate crown or convolute, see FIG. 6. Skewing the crest and buttress in this manner provides a greater surface area of contact between the buttress 20 and the mating flank of the thread formation of the threaded bore in a workpiece in which the fastener 10 is engaged than does a buttress oriented along a radial of the fastener.

It has been noted that the skewed orientation of serrations 18 minimizes the tendency of the serrations to tear large chips of material from the internal mating thread as the screw is removed from the workpiece. While not completely understood, it is believed that this results from the compressive load between the serrations and the mating thread being distributed over a larger surface than that provided by a radial orientation so that the unit force between buttresses 20 and the mating thread is less than that provided by a radial orientation. Thus, there is less liklihood of exceeding the elastic limit of the mating thread which, of course, means that there is more liklihood that the deformation of the mating thread is elastic.

To further minimize the tendency to take a chip of material from the workpiece upon disengagement of the fastener and to improve the reusability of the fastener and increase its resistance to loosening on applications following the initial installation of the fastener in a workpiece, it has been found that inclining the angle of the buttress between 5° to 20° from a plane parallel to the longitudinal axis of the fastener is beneficial. Inclining the buttress face 20, in this manner, while maintaining the overall effect of providing a sufficient locking action to preclude undesired loosening of the fastener after installation, further minimizes the tendencies to shear a chip of material from the workpiece when the fastener is removed.

A further beneficial effect of inclining the buttress face is that in the event chips of material are sheared upon removal of the fastener, the greater included angle B between the buttress face 20 and the ramp 26 of the next adjacent tooth precludes the wedging of any of the chips into the root 24 so that the chips may be readily removed after removal of the fastener so as to minimize deleterious effects of subsequent installation of the fastener into a workpiece.

In an alternate embodiment of a vibration resistant threaded fastener shown in FIGS. 5 through 9 provision is made to provide a bearing pad on the load bearing flank of the threaded fastener to minimize and more positively control the deformation of the mating thread of the internally threaded bore in a workpiece in which the fastener is engaged. The use of the bearing pads as shown in the embodiments in FIGS. 5 through 9 achieved the desired result of controlling deformation in the mating thread flank without detracting from the locking action of the fastener within the workpiece so as to preclude rotation of the fastener tending to loosen its engagement within the workpiece.

As shown in the embodiment of FIG. 5, the fastener 10' having external thread configuration 12' includes a serrated surface 18' on the load bearing flank 16' of the threads 12'. The serrations 18' are preferably identical in configuration to the serrations 18 as described in the embodiment of FIGS. 1 through 4.

In the embodiment of FIG. 5 bearing pads 36 are provided on the load bearing flank of the fastener 10' at circumferentially spaced locations about the flank 16' of the threads 12'. Illustratively, as shown in FIG. 6, three bearing pads 36 are provided about each thread flank. As seen in FIG. 7, the bearing pads 36 are interspersed between the serrations with the height of the bearing pad 36 being slightly below the maximum height of the crest 22' of an individual serration 18'.

Since the surface of the bearing pad is spaced below the crest of the serrations, during installation of the fastener the axial seating force causes the serrations to penetrate into the mating thread until the bearing pads contact the mating thread surface. Additional axial force imparted to the fastener will be transferred by the bearing pads to the mating thread without further serration penetration and embedding in the mating thread form of the workpiece in which the fastener is installed. Loosening or unseating of the fastener is resisted by the buttress face of the serrations, as described above. On succeeding applications further deformation of the mating thread in the workpiece is avoided by the bearing pads which distribute the axial force over the thread surface. In this manner a larger bearing surface is provided which acts to control the amount of penetration of the serrations into the mating thread form in the workpiece. Thus, elastic deformation may be more positively insured to minimize the tendency to shear part of the workpiece thread forms in the form of chips and thus improve the reusability of the fastener within the workpiece to a significant extent.

As is shown in FIG. 6, the crest 22' and buttress 20' have the convolute arcuate shape. This embodiment for the serration configuration is more fully described in commonly assigned co-pending application Ser. No. 470,873 filed May 17, 1974.

FIGS. 8 and 9 show alternate embodiments for the formation of bearing pads. In the embodiment shown in FIG. 8 the bearing pads 38 are formed by truncating a plurality of serrations 18' to form a flat bearing surface spaced below the crest 22' of the individual serrations. One or more adjacent serrations may be truncated in this fashion and the plurality of truncated serrations may be spaced circumferentially about the thread flank 16' in a number of locations. The plurality of smaller bearing surfaces 38 act in the same manner as the larger bearing surface 36 in the embodiment shown in FIG. 7.

in FIG. 9 still another alternate embodiment for providing a bearing surface to limit deformation on the mating thread flank of a workpiece in which the fastener is installed is shown. In this embodiment the crest of alternate serrations are radiused as at 40 to provide a round bearing surface which is below the height of the crest 22' of non-radiused serrations. The alternate radiused serrations below the crest height of the non-radiused serrations provide the desired bearing surface which resists further penetration into the mating thread flank of a workpiece in which the fastener is installed as the axial load induced on the fastener is increased.

Use of the bearing pad or bearing surface has the desired result of controlling the depth of serration tooth penetration in the workpiece and also to limit the serration tooth load permitting a more flexible serration pitch design. In addition, the bearing pads minimize deformation of the mating thread form to insure elastic deformation.

Thus, it is maintained that the present invention provides a threaded fastener which exhibits markedly improved rotation resistant properties without deleterious effects which mar or distort either the thread configuration of the fastener itself or the mating thread configuration in a workpiece in which it is installed. In addition, use of bearing surfaces circumferentially spaced within the serrations on the thread form allow for a more positive control of the amount of deformation in the mating thread formation so that the fastener may be employed through repeated cycles without noticeable loss of effectiveness and without marring or distorting the workpiece in which it is installed.

What is claimed is:

1. A vibration resistant fastener comprising a shank having at least a portion of its length provided with an external thread including a root and a crest, at least a portion of said thread formed with an irregular surface on the flank subjected to a compressive load when said fastener is engaged in a workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging said fastener in the workpiece, said ramp extending from the root to the crest thereof with a buttress extending between said crest and the root of an adjacent serration in a plane generally inclined with respect to the longitudinal axis of said fastener, the height of said buttress between said crest and the root of an adjacent serration being greater at said thread crest than at said point spaced from said thread root, said teeth being formed on the flank subjected to a compressive load in such a manner that said teeth do not provide frictional inpedance to the engagement of the fastener in a mating thread of the workpiece until a compressive load is applied to said fastener.

2. A vibration resistant fastener as defined in claim 1 wherein said buttress is inclined with respect to the longitudinal axis of said fastener within the range having lower and upper limits of about 5° to 20°, respectively.

3. A vibration resistant fastener as defined in claim 2 wherein the included angle between a buttress of one serration and the inclined ramp of an adjacent serration is within the range having lower and upper limits of about 70° to 90°, respectively.

4. A vibration resistant fastener as defined in claim 1 wherein said inclined ramp of each serration forms an angle of between 5° and 25° with a plane parallel to the helix angle of said thread.

5. A vibration resistant fastener as defined in claim 1 wherein each said buttress is oriented at a skewed angle with respect to the radius from the longitudinal axis of the fastener to said serration.

6. A vibration resistant fastener as defined in claim 5 wherein said skewed angle is within the range having lower and upper limits of about 15° to 35°, respectively.

7. A vibration resistant fastener as defined in claim 1 wherein each buttress is formed to be convolute in shape to define an arcuate path from its inner end to its outermost end.

8. A vibration resistant fastener as defined in claim 1 including means forming a raised bearing surface on said thread flank having said serrations, said bearing surface having a height less than the height of said crests on said serrations whereby said bearing surface controls the depth of penetration of the serrations into a mating thread form when said fastener is engaged in a workpiece under a compressive load.

9. A vibration resistant fastener as defined in claim 8 wherein a plurality of bearing surfaces are provided at circumferentially spaced locations about said thread.

10. A vibration resistant fastener as defined in claim 9 wherein each said bearing surface comprises a pad having an upper flattened portion defining the bearing surface area.

11. A vibration resistant fastener as defined in claim 9 wherein each said bearing surface comprises a truncated segment of a serration to define the bearing surface area.

12. A vibration resistant fastener as defined in claim 9 wherein each said bearing surface comprises alternate serrations formed with a radiused crest to define the bearing surface area.

13. A vibration resistant fastener comprising a shank having at least a portion of its length provided with an external thread including a root and a crest, at least a portion of said thread formed with an irregular surface on the flank subjected to a compressive load when said fastener is engaged in a workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging said fastener in the workpiece, said ramp extending from the root to the crest thereof with a buttress extending between said crest and the root of an adjacent serration, the height of said buttress between said crest and the root of an adjacent serration being greater at said thread crest than at said point spaced from said thread root, said teeth being formed on the flank subjected to a compressive load in such a manner that said teeth do not provide frictional impedance to the engagement of the fastener in a mating thread of the workpiece until a compressive load is applied to said fastener, and means forming a raised bearing surface on said thread flank having said serrations, said bearing surface having a height less than the height of said crests on said serrations whereby said bearing surface controls the depth of penetration of the serrations into a mating thread form when said fastener is engaged in a workpiece under a compressive load.

14. A vibration resistant fastener as defined in claim 13 wherein a plurality of bearing surfaces are provided at circumferentially spaced locations about said thread.

15. A vibration resistant fastener as defined in claim 14 wherein each said bearing surface comprises a pad having an upper flattened portion defining the bearing surface area.

16. A vibration resistant fastener as defined in claim 14 wherein each said bearing surface comprises a truncated segment of a serration to define the bearing surface area.

17. A vibration resistant fastener as defined in claim 14 wherein each said bearing surface comprises alternate serrations formed with a radiused crest to define the bearing surface area.

* * * * *